Patented May 25, 1948

2,442,073

UNITED STATES PATENT OFFICE 2,442,073

PROCESS FOR BREAKING PETROLEUM EMULSIONS

Melvin De Groote, University City, and Arthur F. Wirtel, Glendale, Mo., assignors to Petrolite Corporation, Ltd., Wilmington, Del., a corporation of Delaware No Drawing. Application July 13, 1945, Serial No. 604,993

8 Claims. (Cl. 252—340)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring water or brines dispersed in a more or less permanent state throughout the oil which constitutes the continuous phase of the emulsion.

Another object is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline line.

And still another object of our invention is to provide a new demulsifier for petroleum emulsions of the water-in-oil type.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent used in our herein described process for resolving petroleum emulsions, consists of an ester product containing a polyhydric alcohol radical, a diglycollic acid radical, and a plurality of acyloxy radicals

derived from any detergent-forming monocarboxy acid having 8 to 32 carbon atoms, with the proviso that at least one acyl radical is derived from a hydroxylated detergent-forming monocarboxy acid having 8 to 32 carbon atoms, each of the hydroxyls of each polyhydric alcohol being esterified with a group containing at least one of said acyloxy radicals, the number of said groups esterified with polyhydric alcohol hydroxyls being as great as the total number of said polyhydric alcohol hydroxyls. In other words, the number of the groups comprising an acyloxy radical derived from a detergent-forming monocarboxy acid that are ester-linked to each polyhydric alcohol radical, is in each instance equal to the valency of the polyhydric alcohol radical, so that in the ester product each polyhydric alcohol radical is free from any uncombined hydroxyl radical directly attached thereto, and the number of such groups ester-linked to each polyhydric alcohol residue is additional to the number of such groups ester-linked to any other polyhydric alcohol residue contained in the ester.

Detergent-forming monocarboxy acids are those acids having at least 8 carbon atoms which have the capacity to react with alkali to form soap or soap-like products, and are exemplified by fatty acids containing 8 to 32 carbon atoms, such as oleic, linoleic, ricinoleic, stearic, hydroxystearic, palmitic, linolenic, erucic, clupanodonic, myristic, etc., and fatty acids of the character referred to are normally regarded as preferable. The term "detergent-forming monocarboxy acid" includes naphthenic acids. Naphthenic acids are derived from various petroleums, or are obtained by treatments which involve oxidation of hydrocarbon bodies present in the naturally-occurring crude oils. The number of carbon atoms in naturally-occurring naphthenic acids may vary from 10 carbon atoms to 32 or even 38 carbon atoms. Naphthenic acid or admixtures of the type available on the open market and which preferably have a saponification value in the neighborhood of about 250 are suitable. Naphthenic acids of the kind referred to are readily esterified with glycerol to form naphthenin on intimate admixture and agitation in the presence of dried hydrochloric acid gas, using a procedure that is substantially the same as that usually in the formation of stearin from stearic acid and glycerol. It is known that such naphthenic acids can be treated, for example, with halogens so as to produce derivatives such as chloronaphthenic acids. Also included among the detergent-forming acids are those monocarboxy acids sometimes called wax acids or paraffin acids, which are formed as a result of oxidation of paraffin or petroleum waxes, particularly those derived from paraffin base hydrocarbons and which include hydroxylated, as well as non-hydroxylated acids. Acids occurring in certain waxes, such as carnaubic acid, cerotic acid, lanopalmic acid and lanoceric acid, are considered detergent-forming monocarboxy acids. Rosin and resinic acids, such as abietic acid are likewise included. Such acid materials, due to the fact that they react with alkalis to form soap or soap-like products, are commonly called detergent-forming acids.

The terms hydroxylated detergent-forming acids and hydroxy detergent-forming acids, refer to those detergent-forming acids which contain in the acyl radical thereof an hydroxyl or the equivalent. The most common types of hydroxylated detergent-forming carboxy acids are hydroxylated fatty acids containing 8 to 32 carbon atoms, such as ricinoleic acid, monohydroxy and dihydroxystearic acid, trihydroxypalmitic acid, etc. Ester products adapted for use as raw materials in the invention herein described, contain at least one radical of an hydroxylated detergent-forming acid, and preferably, such radical is a radical of an hydroxylated fatty acid containing 8 to 32 carbon atoms. In addition, hydroxylated detergent-forming acids, such as hydroxylated wax acids may be used.

While the terms detergent-forming monocarboxy acid and hydroxylated detergent-forming monocarboxy acid include oxidized acids, as well as acids in their naturally-occurring state, those fatty bodies which are drastically-oxidized have distinctive properties and characteristics and certain ester products containing such drastically-oxidized bodies are claimed in our co-pending application Serial No. 604,996, filed July 13, 1945.

A preferred ester derivative exemplifying the herein contemplated compounds, and especially those for breaking oil field emulsions, may be obtained by esterification reaction between triricinolein and diglycollic acid. Ricinoleic acid may be indicated by the following formula

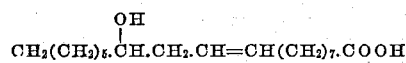

which may be regarded as coming within the more generic formula

OHRCOOH wherein OHRCOO is representative of the acyloxy group of any hydroxylated detergent-forming carboxy acid. If OHRCOO is the acyloxy group of ricinoleic acid, triricinolein may be represented by the formula:

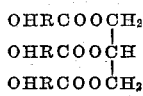

and contains the residue of the polyhydric alcohol glycerol which may be represented as

Triricinolein readily esterifies with diglycollic acid, and if three moles of diglycollic acid are caused to react with one mole of triricinolein, an ester product will be obtained according to the following reaction:

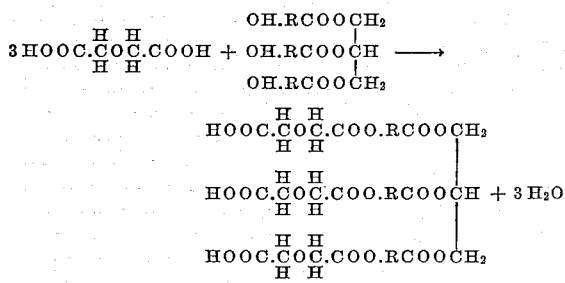

As previously suggested, the foregoing product of esterification is a particularly preferred material for breaking oil field emulsions in the practice of this invention. In the above product it is to be noted that each hydroxyl of polyhydric alcohol (glycerol) is esterified with a group containing an acyloxy radical derived from ricinoleic acid. In this application only those compounds are contemplated wherein each hydroxyl of each polyhydric alcohol is esterified with a group containing an acyloxy radical derived from a detergent-forming monocarboxy acid having 8 to 32 carbon atoms. It is not necessary that each of the hydroxyls contained in an acyloxy radical be esterified, although this is a characteristic of preferred compounds contemplated herein. For example, the hydroxyl in only one or two of the ricinoleic residues may be replaced by a glycollic acid residue.

In carrying on the esterification reaction, it is not essential that a carboxylic group of the diglycollic acid react with the alcoholiform hydroxyl in the acyloxy radical of an hydroxylated detergent-forming acid body while the acyloxy radical of the detergent-forming carboxy acid remains directly connected with the polyhydric alcohol radical. Thus, in the esterification reaction above mentioned, there may be some molecular rearrangement with the production of a compound which may be represented by the following formula:

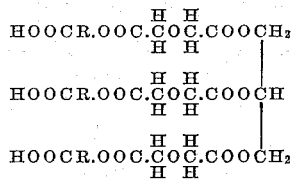

The compound above represented is likewise suitable for use for breaking oil field emulsions in the practice of this invention. It is to be noted that in this compound also there is the characteristic occurrence of a group containing at least one acyloxy radical derived from a detergent-forming carboxy acid esterified with each hydroxyl of polyhydric alcohol. In this particular example the group containing the acyloxy radical (RCOO) that is, esterified with the hydroxyls of the polyhydric alcohol, is the group:

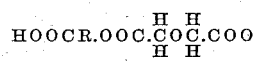

The compounds covered herein do not include compounds such as

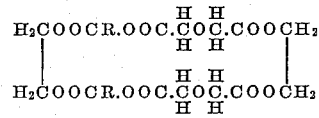

wherein the number of groups containing an acyloxy radical derived from a detergent-forming monocarboxy acid and esterified with hydroxyls of each polyhydric alcohol (two glycol residues in the example above given), is less than the total number of polyhydric alcohol hydroxyls. In the example given there is a total of four polyhydric alcohol hydroxyls and only two groups containing an acyloxy radical derived from a detergent-forming monocarboxy acid esterified therewith.

While the modifications wherein the acyloxy radical derived from the detergent-forming carboxy acid remains directly connected to the polyhydric alcohol residue is normally preponderant and is normally preferred, the other modifications wherein one or more of the diglycollic acid radicals becomes directly attached to the polyhydric alcohol radical are suitable.

In the foregoing and in subsequent formulae, a conventional showing in two dimensional form is resorted to, and no attempt other than this is made to indicate actual space molecular formula. Moreover, distinctions between isomeric forms are to be disregarded.

As a further example of the practice of this invention, diglycollic acid may be reacted with an hydroxylated ester, wherein each of the hydroxyls of glycol is replaced by a residue of hydroxystearic acid or ricinoleic acid, the reaction being as follows:

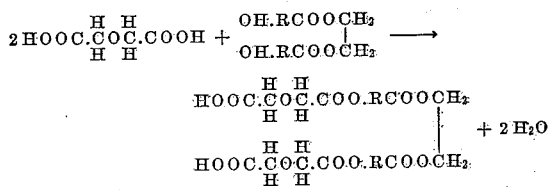

It is also possible that during the esterification there may be only partial molecular rearrangement, so that in the resulting product, one acyloxy radical of a detergent-forming monocarboxy acid may be directly linked to the polyhydric alcohol radical and another acyloxy radical of a detergent-forming monocarboxy acid may be directly linked to a diglycollic acid radical, which, in turn, may be directly linked to the polyhydric alcohol radical. Thus, in the foregoing reaction involving glycol, a reaction product may be formed corresponding with the formula:

$$HOOCR.OOC.\underset{H}{\overset{H}{C}}O\underset{H}{\overset{H}{C}}.COOCH_2$$
$$HOOC.\underset{H}{\overset{H}{C}}O\underset{H}{\overset{H}{C}}.COO.RCOOCH_2$$

and such compounds are also suitable for breaking oil field emulsions according to this invention.

It is not essential that each of the acyloxy radicals derived from a detergent-forming acid that is present in the ester product for each of the hydroxyl groups of the parent polyhydric alcohol be hydroxylated, so long as at least one of the acyloxy radicals is hydroxylated, and thereby affords in the partial ester at least one hydroxy or ester-forming group for esterification with a carboxyl of diglycollic acid. For example, suitable partial esters for reaction with diglycollic acid may be mixed esters, such as

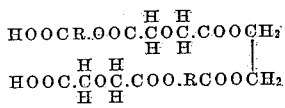

and

OHRCOOCH₂
|
RCOOCH₂ wherein OHRCOO is an hydroxylated acyloxy radical derived from an hydroxylated detergent-forming acid, such as ricinoleic acid, hydroxystearic acid, or the like, and wherein RCOO is an acyloxy group derived from a non-hydroxylated detergent-forming acid, such as oleic acid, palmitic acid, stearic acid, abietic acid, etc. Hydroxylated esters of the mixed type, such as those exemplified above, will readily react with diglycollic acid to form an ester product suitable for breaking oil field emulsions.

A wide variety of polyhydric alcohols may be employed, both of the ether and non-ether types. The following are illustrative of partial esters which are derived from polyhydric alcohols of the ether type and which are suitable for reaction with diglycollic acid.

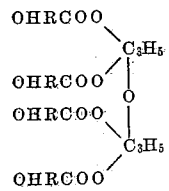

Diglycerol tetraricinoleate

Diethylene glycol diricinoleate

Examples of other polyhydric alcohols from which suitable ester products may be derived, are triglycerol, triethylene glycol, dipropylene glycol, alphabeta gamma butane triol, beta methyl glycol glycerol ether, 1,3 propane diol, isobutylene glycol, monoethylene glycol glycerol ether, mannitol, sorbitol, sorbitol monobutyl ether, erythritol, adonitol, sorbitan, mannitan, etc.

As mentioned above, it is preferable to carry on the esterification reaction, so that at least one carboxyl group remains for each polybasic carboxylic acid residue. However, those products are suitable that are produced by a reaction such that each of the carboxyl groups of the polybasic carboxy acid reacts with an alcoholiform hydroxyl. Thus, if a molecular quantity of triricinolein is heated to approximately 180° C. or higher, with one molecular quantity of diglycollic acid, the reaction product may ultimately involve two of the hydroxyls of the triricinolein, with loss of water, as indicated in the following formula:

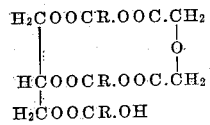

It is normally preferable, however, to control the esterification reaction so that there is at least one free carboxyl group present in the ultimate ester product. This can be accomplished by avoiding an excessively high temperature or prolonged periods of reaction. The preferred product containing at least one free carboxyl group, per molecule, is the product that is most readily prepared in commercial production.

In carrying on the esterification reaction there may develop cross linkages either through the polyhydric alcohols or through the diglycollic acid, due to the polyfunctionality of these materials. For example, in an esterification reaction between triricinolein and diglycollic acid, the resulting product may comprise more complex molecules, such as the following, which illustrate cross linkage through the polyhydric residue.

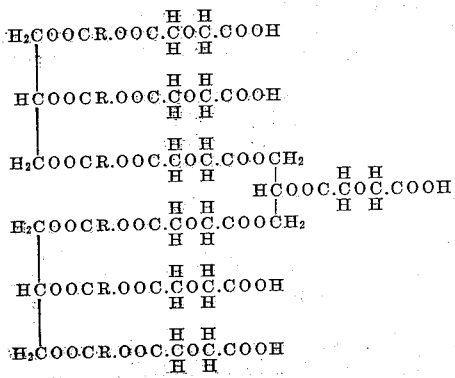

Cross linkage likewise may occur through the diglycollic acid to afford molecular structures, such as

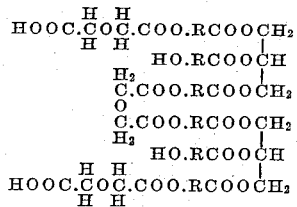

It is apparent that other cross linkages may occur. Such ester products containing more complex molecules are also suitable. It is also apparent that there may be great variations in the molecular weight of the product. The molecular weight of the ester product, as determined by cryoscopic methods, or from obvious composition of the ester, usually runs between about 300 and about 4,000 and is seldom over 6,000. Ester products having a molecular weight over about 10,000 preferably are not employed. During the esterification reaction there may be some polymerization, and polymerized products as well as simple monomers may be used.

In the ester product the presence of a residual hydroxyl group is largely immaterial, provided the residual hydroxyl is not directly attached to a polyhydric alcohol residue. Any such residual hydroxyl group may be left as such, or if desired, reacted either with additional diglycollic acid, or with any monobasic detergent-forming carboxy acid. Alternatively, any such residual hydroxyl may be acylated with monocarboxy acids containing less than 8 carbon atoms. The ester product covered herein may include such simple acylated derivatives; but the finished product must contain at least one acyloxy radical derived from a detergent-forming monobasic carboxy acid having at least 8 carbon atoms in a group that is esterified with each hydroxyl group of each parent polyhydric alcohol. Referring to any residual carboxyl group or groups, it is preferable that such group or groups be left as such.

An acidic carboxylic hydrogen atom may also be replaced by reaction with an alcoholiform hydroxyl of an hydroxylated acid. The acidic hydrogen atom may also be replaced by a residue of a monohydric alcohol, e. g., aliphatic alcohols, such as methyl, ethyl, propyl, hexyl, octyl, decyl, cetyl, ceryl, etc.; alicyclic alcohols, such as cyclohexanol and the like; or aralkyl alcohols, such as benzyl alcohol, naphthyl ethyl alcohol, and the like. Similarly, the acid hydrogen may be replaced by reaction with an ether alcohol, such as those derived by reacting any of the foregoing alcohols with an alkylene oxide such as ethylene oxide, propylene oxide, butylene oxide or the like (but excluding compounds such as glycide or the like), typical ether alcohols of the kind mentioned being illustrated by the following formulae:

$$C_4H_9OC_2H_4OC_2H_4.OH$$
$$C_4H_9OC_2H_4.OH$$
$$C_3H_7OC_2H_4.OH$$
$$C_6H_{11}OC_2H_4.OH$$
$$C_6H_5CH_2OC_2H_4.OH$$

By reacting hydroxyaromatic compounds, such as phenol, naphthol and the like with an alkylene oxide, such compounds can be converted to monohydroxy aralkyl ethers which are suitable, and such compounds, together with alphyl, alicyclic and aralkyl alcohols and alcohol ethers, are regarded as alkyl alcohols and as comprising an alkyl group as the term "alkyl" is used herein.

As aforesaid, aryl groups are not regarded as included in the term "alkyl" (although aralkyl groups are included). A polyhydric alcohol residue may be present in a group which replaces the acid hydrogen atom of the carboxyl group, provided each hydroxyl of the alcohol is esterified with a group containing at least one acyloxy group of a detergent-forming carboxy acid having at least 8 carbon atoms. When reference is made to an ester product containing a free carboxyl group, it is intended that the product contain a COOH group, in which the acidic hydrogen atom has not been replaced. The herein described products containing a carboxylic group are intended to contemplate the acid as such, or in the form of an ester, as mentioned hereinabove. Since, however, products containing a free carboxyl are normally preferred, the additional expense of esterifying the acidic hydrogen atom of a free carboxyl usually is not justified, or in any event, is employed in connection with part of the carboxyl radicals only.

While reference has been made hereinabove to various detergent-forming monocarboxy acids, it is apparent that simple derivatives, such as the halogenated compounds, are functional equivalents. For example, chlorinated ricinoleic acid, or chlorinated triricinolein may be employed instead of ricinoleic acid or triricinolein. Brominated oleic acid may be used instead of oleic acid. Likewise, hydrogenated abietic acid may be used instead of abietic acid. In such cases, the monobasic detergent-forming carboxy material, notwithstanding modifications of the kind indicated, still has the same functional properties as the unmodified material, and thus acts in the same manner as far as esterification reactions of the character herein described are concerned. It is also possible, for example, to condense two moles of ricinoleic acid and produce one mole of monobasic diricinoleic acid. Likewise, monobasic triricinoleic acid and monobasic tetraricinoleic acid may be used. Also the condensation product of a substance such as ricinoleic acid or hydroxystearic acid, with some low molal hydroxy acid such as lactic acid, may be used. It is to be understood that the term detergent-forming monobasic carboxy acid includes such functional equivalents.

Generally speaking, the majority of the esters hereinabove described are substantially water-insoluble, i. e., are not soluble in 1 part to 1,000 parts of water at 50° F. Water solubility can be increased by obvious variants, and may be illustrated by reference to compounds derived from ethylene glycol, such as the following:

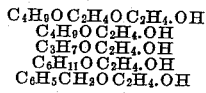 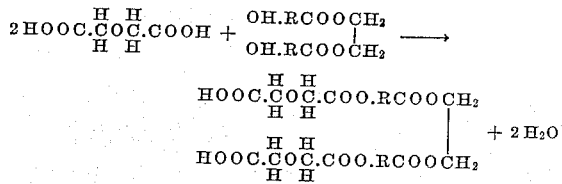

Naturally, if ethylene glycol is replaced by diethylene glycol, water solubility is enhanced. This is also true if triethylene glycol, tetraethylene glycol, or some higher homologue in the series be employed. Similarly, some other polyhydric alcohol, such as, for example, glycerol, diglycerol, sorbitol, sorbitan, pentaerythritol, or the like, can be treated with an alkylene oxide, such as ethylene oxide, propylene oxide, butylene oxide, or the like, to produce ether alcohols, or more specifically, etherified diols or etherified triols, in which the ether linkage occurs one time or perhaps several times at each original hydroxyl position. Thus, following such procedure, one may obtain compounds which are actually water-soluble. In a broader sense, then, the compounds herein contemplated may be oil-soluble, or oil-insoluble, they may be water-soluble, or water-insoluble, and may, in fact, show little or no solubility in either oil or water. This latter statement is something of a paradox, but it is to be emphasized that there esters are frequently effective at enormous dilutions, when used as demulsifiers for water-in-oil emulsions. For instance, we have repeatedly conducted experimental tests, in which the ratios employed vary from 1 part of demulsifier to 10,000, and at times up to 50,000 parts of emulsion. For practical purposes, when a compound is soluble in less than 1 part to 10,000, it is commonly referred to as "insoluble," but in such extremely dilute range the word "insoluble" is purely relative, and perhaps meaningless.

As an example of enhanced water solubility, one need only replace ethyleneglycol with nonaethyleneglycol, or some higher homologue, such as examples where $n$ in the following formula represents values from 7 to 15. Compare this formula with an analogue involving ricinoleic acid ester of ethyleneglycol:

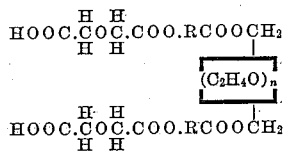

Nonaethyleneglycol hexaricinoleate, a product which is commercially available, is of distinct utility when converted into acidic glycollic acid esters.

In the preparation of esterification products, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent, such as xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas such as nitrogen or $CO_2$. A catalyst, such as toluene sulphonic acid, may be added to the extent of about one-half to 1½%, by weight, if desired. Generally speaking, however, the reactions take place rapidly, quickly and completely by simply heating substances to enter into the reaction in desired stoichiometric proportions at a temperature above the boiling point of water, usually between about 110° and 160° C., providing there is no decomposition. The most desirable products are obtained by combinations in which the ratio of moles of diglycollic acid to moles of particular material reacting therewith are within the ratios of 1 to 3 and 3 to 1.

Esterification reactions of the kind contemplated are used for the production of a wide variety of esters, resinous materials, sub-resinous materials, and include plasticizers. Attention is directed to the following patents which are a cross-section of conventional esterification procedure, which can be applied in any instance to the production of the herein contemplated esters.

British Patent, No. 422,845, Jan. 14, 1935.
British Patent to Eckey, No. 500,765, Feb. 15, 1939.
U. S. Patent to—Malm, No. 2,170,030, Aug. 22, 1939.
Bradley, No. 2,166,542, July 18, 1939.
Barrett, No. 2,142,989, Jan. 10, 1939.
Frazier, No. 2,075,107, Mar. 30, 1937.
Sly, No. 2,073,031, Mar. 9, 1937.
Bradley, No. 1,951,593, May 20, 1934.
Lawson, No. 1,909,196, May 16, 1933.
Kessler, No. 1,714,173, May 21, 1929.
Van Schaack, No. 1,706,639, Mar. 26, 1929.
Jones, No. 2,264,759, Dec. 2, 1941.
Wietzel, No. 1,732,392, Oct. 12, 1929.
Groves et al., No. 1,993,738, Mar. 12, 1935.

Attention is directed to a comprehensive article entitled "Polyhydric alcohol esters of fatty acids, their preparation, properties, and uses," by H. A. Goldsmith, in Chemical Reviews, volume 33, December 1943, Number 3.

The following are specific examples of the preparation of preferred products, for use for the particular purposes herein indicated:

EXAMPLE 1

One pound mole of triricinolein (in the form of castor oil, which ordinarily contains approximately 85 to 90%, triricinolein) is reacted with one pound mole of diglycollic acid to produce a mixture of acid diglycollates consisting essentially of triricinolein monobasic diglycollate. The reaction may be caused to occur by heating the mixed materials at a temperature of approximately 140° to 170° C. for approximately 6 to 12 hours. The reaction can be followed roughly by withdrawing a small sample of the partially reacted mass and permitting it to cool on a watch crystal. When the reaction has become completed, no crystals of diglycollic acid appear. When the same no longer shows the presence of such crystals on cooling, it can be titrated with a standard volumetric alkaline solution to indicate that the acidity which remains obviously is due entirely to carboxylic hydrogen and not to any unreacted diglycollic acid.

EXAMPLE 2

Same procedure as followed in Example 1, except that one uses two pound moles of diglycollic acid instead of one pound mole.

EXAMPLE 3

Same procedure as followed in Example 1 preceding, except that 2½ to 2¾ pound moles of diglycollic acid are used for each pound mole of triricinolein.

EXAMPLE 4

Same procedure as is employed in the preceding three examples, except that a temperature of approximately 150 to 180° C. is employed.

EXAMPLE 5

The same procedure is followed as in Examples 1 to 3, preceding, except that a temperature of 180 to 200° C. is employed.

EXAMPLE 6

The neutral ester derived from ricinoleic acid and pentaerythritol is substituted for tricinolein in previous Examples 1 to 4, inclusive; and the ratio of diglycollic acid is changed so as to correspond to one pound mole, two pound moles, three pound moles, and 3½ pound moles for each pound mole of pentaerythritol tetraricinoleate.

Example 7

The neutral ester derived from ricinoleic acid and ethylene glycol, that is, ethylene glycol diricinoleate, is substituted for triricinolein, in preceding Examples 1 to 5, inclusive, except that the ratio of diglycollic acid is changed to correspond to one and also to 1½ pound moles of the dicarboxy acid for each mole of ethylene glycol diricinoleate.

Example 8

The same procedure is followed as in Example 7, preceding, except that glycols which enhance the hydrophile property are employed, as, for example, diethylene glycol diricinoleate, triethylene glycol diricinoleate, tetraethylene glycol diricinoleate, hexaethylene glycol diricinoleate, and nonaethylene glycol diricinoleate.

It is to be noted that similar compounds are readily derivable from the use of either hydroxystearic acid, for example, or a polyricinoleic acid, such as diricinoleic acid or triricinoleic acid, instead of the ordinary ricinoleic acid which is monoricinoleic.

The esterification products, according to Examples 1 to 8, are viscous, yellowish materials resembling somewhat blown castor oil in consistency. For the most part, they are only slightly soluble, in either water or in paraffin base mineral oil (not more than 1 part to 1,000), but go into solution with lower alcohols (methyl to octyl) to form a clear solution. The solutions may be made up in equal parts, for example. Example 8 typifies the type in which oil solubility, if anything, decreases but water solubility increases. Oil solubility can be, of course, increased in an obvious manner. The simplest procedure is to eliminate part of the hydroxylated fatty acids, such as ricinoleic acid and substitute non-hydroxylated fatty acids, such as oleic acid, or if desired, an acid such as naphthenic acid. For example, one can obtain a mixed glyceride from one mole of ricinoleic acid and two moles of naphthenic acid, or from two moles of ricinoleic acid and one mole of naphthenic acid. Similarly, naphthenic acid (or oleic acid) combinations can be obtained from pentaerythritol, in which one to three moles of ricinoleic acid appear and the remaining hydroxyls are esterified with either naphthenic acid or oleic acid.

As specific examples of chemical compounds typifying the products herein obtained, one may point out that the following appear as constituents of one or more of the previous examples, to wit triricinolein monodiglycollate, triricinolein di-diglycollate, or triricinolein tri-diglycollate.

In the preparation of esters, particularly complete esters from detergent-forming monocarboxy acids, and particularly higher fatty acids, one may employ other procedures. See Oil and Soap, volume 21, No. 5, page 145, and volume 22, No. 3, page 57. For instance, pentaerythritol tetraricinoleate can be prepared by treating pentaerythritol with ketene so as to prepare the tetra-acetate, and likewise, treating triricinolein with methyl or ethyl alcohol, so as to form methyl or ethyl ricinoleate, and reacting such low molal tetraacetate under conditions described in the aforementioned articles, so as to yield methyl or ethyl acetate and pentaerythritol tetraricinoleate.

We wish to emphasize the fact that the most outstanding compounds herein contemplated for breaking of petroleum emulsions, particularly from the viewpoint of effectiveness as demulsifiers, as well as ease and economy of manufacture, are those obtained by reaction between one pound mole of triricinolein, and a plurality of pound moles of diglycollic acid, without any subsequent change in respect to the uncombined carboxylic hydrogen atoms. Note particularly, Examples 2 to 5, inclusive, preceding. Such compounds are so outstanding that they represent, in effect, an invention within an invention. Such compounds of outstanding effectiveness for breaking petroleum emulsions are limited to those which are substantially insoluble in both crude oil and in water.

Some of the ester products above described are somewhat soluble in oil, while others are substantially insoluble in oil. If the ester product is such that only one part or less is soluble (as determined by usual visual methods) in 1,000 parts of ordinary straight-run kerosene from Pennsylvania crude, the product is to be regarded as substantially insoluble in oil. Most of the ester products hereinabove described are sub-resinous in character and of a viscous or balsam-like consistency. In the case of some of the interacting materials, especially the polyhydroxylated fatty bodies, it is possible by prolonged heating at relatively high temperatures to obtain a product that is of a hard, horny character, and lacks appreciable solubility in oil or in lower aliphatic alcohols. Care should be taken not to produce such hard and totally oil-insoluble or alcohol-insoluble bodies.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, when employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our herein described process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as it is concerned with demulsification of petroleum emulsions of the water-in-oil type, is concerned with the admixture of the ester, as described, with a viscosity-reducing solvent, such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier and 15% to 60% solvent, largely, if not entirely, non-aqueous and so selected to give a solution or mixture particularly adaptable for proportional pumps or other measuring devices. The following examples will illustrate the aspect of our invention.

DEMULSIFIER

Example 1

| | Per cent |
|---|---|
| Partial ester, as exemplified by previous Example 3 | 60 |
| Xylene | 20 |
| Isopropyl alcohol | 20 |

DEMULSIFIER

Example 2

| | Per cent |
|---|---|
| Fractional partial ester, as per previous Example 4, derived from reactants in molal ratio of 2½ to 1 | 80 |
| Cresylic acid | 20 |

DEMULSIFIER

Example 3

| | Per cent |
|---|---|
| Partial ester, as per previous Example 6 | 45 |
| Aromatic petroleum solvent | 20 |
| Isobutyl alcohol | 20 |
| Acetone | 15 |

(The above proportions represent percentage by weight.)

The results obtained with the herein contemplated compounds are absolutely unexpected and unlooked for, in light of the demulsifying action of other compounds of apparently analogous structure. For instance, it is conventional practice to use fractional esters derived from triricinolein or other esters, as herein described as reactants, in combination with other dicarboxy acids, such as phthalic acid, maleic acid, malic acid, citraconic acid, azelaic acid, adipic acid, etc. On numerous emulsions, the diglycollic acid derivatives have given results which are simply outstanding, in comparison with such other analogous partial esters. In other words, it appears that for some unexpected reason, the ether grouping of diglycollic acid, in combination with the carboxylic radicals and the remainder of the molecule, give some exceedingly effective adsorption property or orientation property which gives results so extraordinarily unusual.

As typical of such results in actual practice, the following are noted:

FIELD TEST No. 1

On an oil-producing property located in the Walters field at or near Walters, Kansas, the emulsion produced contained approximately 40% of emulsion and water. The emulsion broke readily at 70° F., using a demulsifier corresponding substantially to Example 3, preceding. The residual oil contained a total of one-tenth percent emulsion or water. The total time involved, both in mixing and settling, was 30 minutes. The ratio of demulsifier used on the basis of barrels of recovered oil, was 1 to 10,000. All told, such results represent an improvement of at least 40% over the next best available compound, of the same structure but obtained from some other dibasic acid, such as phthalic, maleic, adipic, etc., instead of diglycollic, notwithstanding the fact that this latter series of comparative tests were conducted at 50° F. higher in temperature.

FIELD TEST No. 2

On an oil-producing property located in the Edmond field at or near Edmond, Oklahoma, the emulsion produced contained approximately 15% of emulsion and water. The emulsion broke readily at 70° F., using a demulsifier corresponding substantially to Example 3, preceding. The residual oil contained a total of one-tenth percent emulsion or water. The total time involved, both in mixing and settling, was 30 minutes. The ratio of demulsifier used on the basis of barrels of recovered oil, was 1 to 5,000. All told, such results represent an improvement of at least 20% over the next best available compound, of the same structure, but obtained from some other dibasic acid, such as phthalic, maleic, adipic, etc., instead of diglycollic, notwithstanding the fact that this latter series of comparative tests were conducted at 50° F. higher in temperature.

FIELD TEST No 3

On an oil-producing property located in the Olla field at or near Olla, Louisiana, the emulsion produced contained approximately 40% of emulsion and water. The emulsion broke readily at 120° F., using a demulsifier corresponding substantially to Example 3, preceding. The residual oil contained a total of two-tenths percent emulsion or water. The total time involved, both in mixing and settling, was 2 hours. The ratio of demulsifier used on the basis of barrels of recovered oils, was 1 to 5,000. All told, such results represent an improvement of at least 50% over the next best available compound, of the same structure, but obtained from some other dibasic acid, such as phthalic, maleic, adipic, etc., instead of diglycollic.

The polyhydric alcohol esters herein contemplated for reaction with diglycollic acid, may be considered as being in the class of an alcohol, i. e., a monohydric alcohol or a polyhydric alcohol. For instance, a mixed glyceride ester containing two oleyl radicals and one ricinoleyl radical, would exemplify a monohydric alcohol, whereas, a mixed ester having one oleyl radical and two ricinoleyl radicals, or, for that matter, triricinolein would represent a polyhydric alcohol. If an alcohol is indicated by the formula:

$$Y'(OH)_n$$

where $n$ indicates the number 1 or more, and if diglycollic acid be indicated for convenience by the formula:

$$X'(COOH)_2$$

then the reaction between a polyhydric alcohol and diglycollic acid will readily result in a compound which may be indicated by the following formula:

$$YX(COOH)_{n'}$$

where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, then examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals, or there might be both. This is indicated by the following:

$$(Y.X)_q(OH)_{n'}$$
$$(Y.X)_q(COOH)_{m'}$$
$$(OH)_{n''}(YX)_q(COOH)_{m''}$$

in which $q$ indicates a small whole number (one in the case of a monomer, and probably not over 10 and usually less than 6), and $m'$ and $n'$ indicate the number 1 or more, and $m''$ and $n''$ indicate a small or moderately-sized whole number, such as 0, 1 or more, but in any event, probably a number not in excess of 10. Actually, the preferable type of reagent would be more apt to contain less than 10, and in fact, less than 5 free hydroxyl radicals. It is not necessary to remark that residual carboxyl radicals can be permitted to remain as such, or can be converted in any suitable manner, into an ester. Conversion into the ester would be by means of a monohydric alcohol, such as methyl alcohol, ethyl alcohol, propyl alcohol, butyl alcohol, hexyl alcohol, etc.

For practical purposes, however, we have found that the most desirable products are obtained by combinations, in which the ratio of the alcoholic reactant to the acid is within the ratio of three to one and one to five, and in which the molecular weight of the resultant product does not exceed 8,000, and is usually less than 5,000, and preferably, less than 3,000. This is particularly true if the resultant product is soluble to a fairly definite extent, for instance, at least 5%, in some solvent, such as water, alcohol, benzene, dichloroethyl ether, acetone, cresylic acid, or the like. This is simply another way of stating that it is preferable that the product be of the sub-resinous type, which is commonly referred to as an A resin or a B resin, as distinguished from a C resin, which is a highly infusible, insoluble resin (see Ellis, Chemistry of Synthetic Resins (1935), pages 862, et seq.).

In recapitulating what has been said previously, the sub-resinous, semi-resinous, or resinous product, herein contemplated, may be indicated by the following formula:

$$(OH)_{n''}(Y_{y'}X_{x'})_q\begin{matrix}(COOH)_{m''}\\(COO.Z)_{m''}\end{matrix}$$

in which the characters have their previous significance, and $y'$ represents a small whole number not greater than 3, and $x'$ represents a small whole number not greater than 5; $q$ is a small whole number less than 10, and preferably 1 to 5; Z represents a hydrogen ion equivalent, such as a hydrogen atom, or an organic radical derived from a monohydric alcohol.

Sub-resinous materials having the repetitious unit appear 3 to 10 times and having a plurality of free carboxyl radicals or free hydroxyl radicals, or both, are well known in a variety of forms and find practical application in demulsification of crude oil emulsions. Generally speaking, the molecular weight of such sub-resinous materials, regardless of class, is less than 10,000 and is more apt to be in a range of 3 to 5,000 as an upper limit. A more elaborate description of this type of material appears in numerous patents concerned with demulsification of crude oil emulsions, and reference is made to such patents for a more elaborate description.

Attention is directed to our co-pending applications Serial Nos. 604,994, 604,995, 604,996, 604,997, 604,998, 604,999, 605,000, 605,001 and 605,002 filed July 13, 1945, all of which are related to the present application, in that such co-pending applications are concerned, among other things, with the breaking of oil field emulsions by means of demulsifiers containing a diglycollic acid radical.

The new chemical products or compounds herein described form the subject-matter of our divisional application Serial No. 707,978, filed November 5, 1946.

Having thus described our invention, what we claim as new and desire to secure by Letters Patent is:

1. A process for breaking petroleum emulsions of the water-in-oil type, characterized by subjecting the emulsion to the action of an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical.

2. The process of claim 1, wherein said ester contains only one polyhydric alcohol radical.

3. The process of claim 1, wherein the ester contains only one polyhydric alcohol radical, and each of said detergent-forming monocarboxy acyloxy radicals is an acyloxy radical derived from a fatty acid having 8 to 32 carbon atoms.

4. The process of claim 1, wherein the ester contains only one polyhydric alcohol radical, and each of said detergent-forming monocarboxy acyloxy radicals is an acyloxy radical derived from an hydroxylated fatty acid having 8 to 32 carbon atoms.

5. The process of claim 1, wherein the ester contains only one polyhydric alcohol radical, and all detergent-forming monocarboxy acyloxy radicals are ricinoleic acid radicals.

6. A process for breaking petroleum emulsions of the water-in-oil type, characterized by subjecting the emulsion to the action of triricinolein mono-diglycollate.

7. A process for breaking petroleum emulsions of the water-in-oil type, characterized by subjecting the emulsion to the action of triricinolein di-diglycollate.

8. A process for breaking petroleum emulsions of the water-in-oil type, characterized by subjecting the emulsion to the action of triricinolein tri-diglycollate.

MELVIN DE GROOTE.
ARTHUR F. WIRTEL.

REFERENCES CITED

The following references are of record in the file of this patent:

UNITED STATES PATENTS

| Number | Name | Date |
|---|---|---|
| 1,976,602 | De Groote et al. | Oct. 9, 1934 |
| 2,310,395 | Carruthers | Feb. 9, 1943 |
| 2,363,506 | De Groote et al. | Nov. 28, 1944 |
| 2,366,190 | Hurn | Jan. 2, 1945 |